Patented Nov. 18, 1952

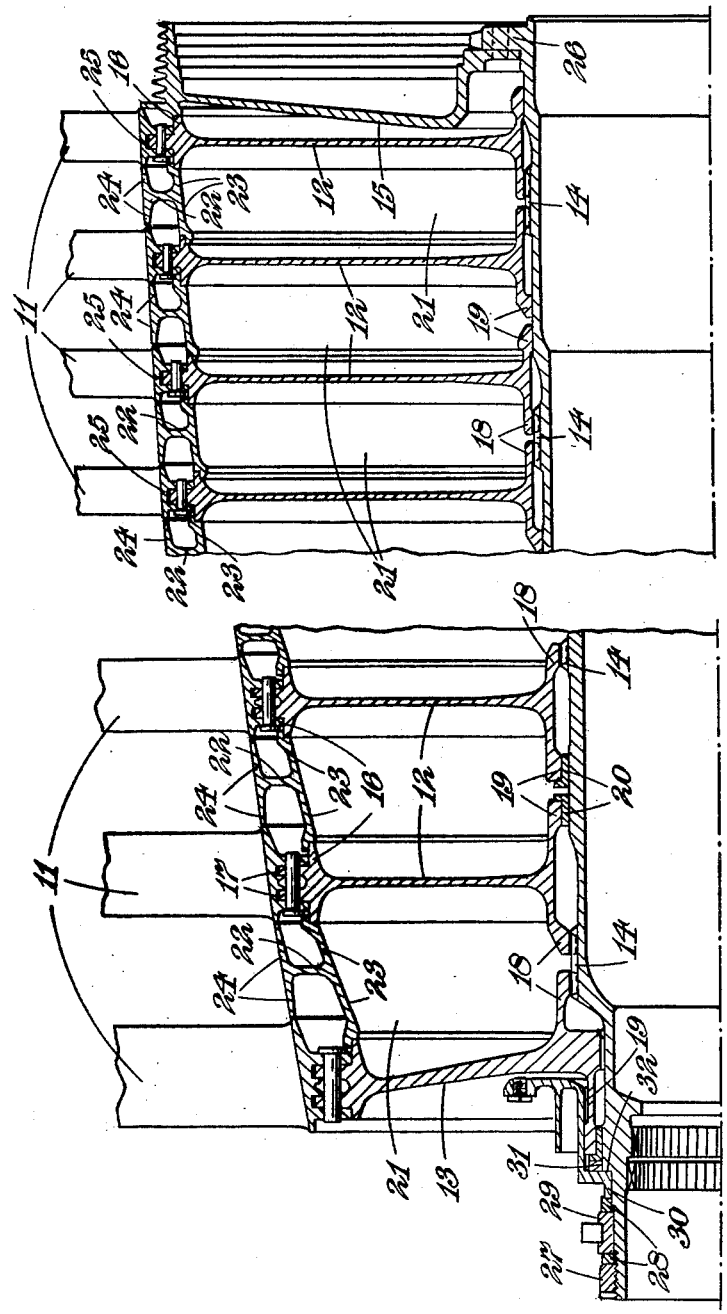

2,618,463

UNITED STATES PATENT OFFICE 2,618,463

MULTISTAGE AXIAL COMPRESSOR AND TURBINE

Adrian Albert Lombard, Allestree, Kenneth Ivor Clifford Vincent, Alvaston, and Frederick William Walton Morley, Aston-on-Trent, England, assignors to Rolls-Royce Limited, Derby, England, a British company Application February 13, 1948, Serial No. 8,198
In Great Britain February 20, 1947

11 Claims. (Cl. 253—69)

The present invention relates to multi-stage axial compressors and turbines, and seeks to provide a rotor construction, having the advantages as regards ease of manufacture, lightness of structure, and ease of assembly and disassembly.

A particular application of the invention is to gas-turbine-engines for aircraft-propulsion, where these objects are of particular importance, bearing in mind the necessity for reducing the overall weight as much as possible, and for providing a construction which is readily capable of stripping or disassembly for inspection and rebuilding.

According to this invention, a rotor construction for an axial multi-stage compressor or turbine comprises a central shaft, rotor blading, a plurality of relatively thin cross-section discs carrying the blading peripherally and supported at their centres in axial alignment on the shaft to have axial freedom on the shaft, said discs inter-abutting directly or indirectly adjacent their peripheries to constitute a rotor drum, and tightening means to nip the disc assembly axially by applying an axial tension to the shaft. The term "relatively thin in cross-section," referring to the discs, means that, individually, the discs would have insufficient strength in flexure to accommodate gyroscopic and other forces arising in running of the assembly. The inter-abutment between adjacent discs is preferably indirectly effected through the medium of spacer-rings, positioned adjacent the root-fixings of the blading, and conveniently such rings have spigoted engagement with the discs.

Preferably the discs engage the shaft torsionally, e. g. by splines or the equivalent providing axial freedom thereon; in this manner torque is transmitted through the shaft and the drum constituted by inter-abutment of the peripheries of the discs is relieved from major torsional loads.

According to a feature of the invention, in order to apply the axial load to the discs from the tightening means, there are provided substantially rigid end-plates one at each end of the discs. The end-plates which may carry blades peripherally, are conveniently dished or otherwise strengthened.

The dished end-plates are preferably arranged so that their convex surfaces face towards the discs, so that the centrifugal loading on them tends to flatten them and tighten them on the disc assembly at the periphery thereof.

According to a feature of this invention, the said tightening means includes a shoulder on the shaft providing an abutment for the disc assembly at one end of the shaft and a nut or the like having threaded engagement with the shaft to apply an axial load to the opposite end of the disc assembly. Preferably the axial load applied to the disc assembly by the tightening means is predetermined by providing a second shoulder on the shaft near said opposite end of the disc assembly such that the assembly does not overhang the shoulder and by providing a washer between the assembly and the nut or the like having an axial thickness greater by a preselected amount than the space between the end of the disc assembly and the shoulder.

There will now be described by way of example of this invention, one construction of rotor for an axial multi-stage compressor, the description referring to the accompanying drawing which illustrates a radial section through the inlet and outlet end portions of the rotor with the intermediate portion omitted.

The rotor comprises a central hollow steel shaft 10 and a number of stages of compressor blading 11 supported in a suitable manner at the peripheries of the rotor drum. All stages of blading with the exception of one stage are mounted on the peripheries of discs 12 of relatively thin cross-section, the first stage (the exception) being carried on the periphery of an end-plate 13 which is rigid compared with discs 12. An end plate 15 is provided at the outlet end of the rotor.

The shaft 10 is of stepped form increasing in diameter through the stages from the inlet end to the outlet end, and is provided externally with splined formations 14 through which the discs 12 are torsionally engaged with the shaft in the manner described below.

The discs 12 are of plane form, are relatively thin in cross-section in that they have insufficient strength individually in flexure to accommodate gyroscopic and other forces arising in running, and have flanged peripheries 16 with radial webs 17 to which the blades 11 are attached. The discs are also formed at their centres with a pair of oppositely-directed axial cylindrical extensions 18, 19 surrounding the shaft 10. The extensions 18 are formed with internal splines to co-operate with the splines 14 on the shaft to engage the discs torsionally with the shaft.

The extensions 19 engage by their free ends (that is the ends remote from the associated discs) on plain portions on the shaft 10. The free ends are thickened with respect to the thin-walled portions thereof extending between the free ends and the discs and the length of these extensions and their other dimensions are such that extension 19 is radially deformable along its length to permit expansion of the discs relative to the shaft under centrifugal loads and that the free end remains in contact with the shaft so as to maintain the alignment of the discs on the shaft.

In this construction the discs 12 and associated extensions 19 of the initial compression stages are formed from a light metal alloy having a coefficient of thermal expansion greater than that of steel, and in order to ensure, by pre-stressing the free-ends of the extensions 19, that relative thermal expansion of the free-end and shaft shall not occur, steel rings 20 are shrunk onto or into the extensions. In this way alignment of the light alloy discs is maintained.

The discs 12 of the later stages are formed from steel and the free ends of their extension 19 bear directly on the shaft.

It will be appreciated that since the discs 12 have a relatively thin cross-section, the centrifugal loading on the discs 12 and blades 11 at the high rotational speeds experienced in operation causes radial expansion of the discs thus increasing the diameter of the central bore of the discs and also that this expansion is greater than that of the hollow shaft. The discs would thus be capable of moving out from alignment with the shaft. However, the expansion of the discs is accommodated by coning of the extensions 19 by deformation of the thin walled portion and this deformation relieves the free ends from heavy centrifugal loads whereby they are able to maintain the alignment of the discs on the shaft.

The discs 12 are in axially-spaced relation on the shaft 10 and are free for axial movement on the shaft.

The discs 12 inter-abut adjacent their peripheries indirectly through spacer-rings 21 which are of a substantially H-section and are positioned with their central webs 22 substantially radially of the compressor rotor axis, with their inner flanges 23 in spigoted engagement with flanged peripheries 16 of the discs 12, and with their outer flanges 24 in alignment with the outer surfaces of the root-platforms 25 of the blades 11 to provide a smooth continuous outer surface to the drum assembly. It will be seen that in the initial compressor stages, the flanges 23 spigot around the flanged peripheries 16 and that in the later stages alternate flanges 23 spigot around and within alternate flanged disc peripheries. A similar spacer ring 21 is provided between the end-plate 13 and the first disc 12. The end-plate 15 however abuts by its periphery directly on to the last disc 12.

The end-plates 13, 15 are rigid as compared with the discs 12 and are of dished form being positioned with their convex surfaces towards the discs 12. The dishing of the end-plates permits an axial load to be applied to the discs 12 in the manner described below. Moreover, centrifugal loading of the end-plates tends to tighten them on discs making the drum construction more rigid.

The end-plate 15 abuts against a shoulder 26 formed by a flange on the shaft and provides an abutment at its periphery to permit the discs 12 to be nipped axially by a load applied by displacing the end-plate 13 axially of the shaft in assembly of the rotor.

In order that the axial load may be applied to the disc assembly at its periphery through the end plate 13, which is engaged on the shaft in a like manner to the discs 12, a ring nut 27 is threaded on the shaft 10 and is arranged to apply an axial load onto the extension 19 of the end-plate 13 through washers 28, race 29 for the front shaft bearing, stepped sleeve 30 and a further washer 31 located between the sleeve 30 and the end-plate 13. In order that an excessive nip shall not be applied to the disc assembly, a shoulder 32 is formed on the shaft and the disc assembly is arranged to terminate close to the shoulder 32 but not to overhang it. The washer 31 is then selected to have an axial thickness equal to the distance between the shoulder 32 and the end of the assembly (represented by the free end of the extension 19 of end-plate 13) plus a predetermined amount dependent on the desired degree of nip. The nut 27 is then tightened until the stepped sleeve 30 abuts against the shoulder 32. Tightening action thus puts the shaft into tension and loads the discs axially at their peripheries.

In this manner a rotor drum is obtained which is of relatively light construction but which is capable of withstanding gyroscopic loads experienced in operation, such as might arise from aircraft manoeuvring, and having a high whirling speed outside the normal running range of the compressor. The gyroscopic loads tend to tilt the discs and thus to open up the disc assembly at one side and close it at the other; this tendency is restrained by the tension in the shaft and axial peripheral load on the discs so that the degree of nip will be adjusted to load the discs to an extent greater than gyroscopic loads which will be experienced in use.

The spigoting of the spacers on the discs assists in the transmission of torsional loads through the wall of the rotor since expansion of the discs due to centrifugal loads increase the frictional effect between the discs and spacers. Relative rotation of the discs and spacers is thus avoided.

We claim:

1. A rotor construction for an axial multi-stage compressor or turbine comprising a central shaft, a plurality of relatively thin cross-section discs, said discs being axially spaced apart at their centres and peripheries and being supported at their centres in axial alignment on the shaft, for each disc interengaging axially-directed elements on said shaft and said disc whereby said discs are torsionally engaged with the shaft and whereby each said disc has at its centre axial freedom on the shaft independently of the other discs, a plurality of stages of rotor blading, each stage of rotor blading being carried on the periphery of a disc, a plurality of spacer rings, there being a spacer ring interposed between each pair of adjacent discs at the peripheries thereof to abut against the discs, and tightening means to nip the disc assembly axially in compression through the peripheries of the discs and said spacing rings by applying an axial tension to the shaft.

2. A rotor construction as claimed in claim 1, wherein said tightening means includes a shoulder on the shaft providing an abutment for one end of the disc assembly, and a nut having threaded engagement with the shaft and arranged to engage the opposite end of the disc assembly to apply an axial load thereto by placing the shaft in tension.

3. A rotor construction for an axial multi-stage compressor or turbine comprising a central shaft, a plurality of relatively thin cross-section discs, said discs being supported at their inner radii in axial alignment on the shaft each to have unrestrained axial freedom on the shaft and each to be torsionally engaged with the shaft independently of the other discs, a plurality of stages of rotor blading, each stage of rotor blading being carried on the periphery of a disc, a plurality of spacer rings, there being a spacer ring interposed between each pair of adjacent discs to abut against the discs near their peripheries, a pair of end plates located one at at each end of the thin disc assembly in peripheral abutment with the end discs, one of said end plates being dished and arranged to be convex towards the discs, said end plates being rigid compared with the discs, and tightening means operative between the end plates and the shaft to nip the disc and end plate assembly axially in compression through the peripheries of the discs and end plates and the spacer rings by applying an axial tension in the shaft.

4. A rotor construction as claimed in claim 3, wherein both end-plates are dished so as to be convex towards the discs.

5. A rotor construction as claimed in claim 3, wherein said tightening means includes a shoulder on the shaft providing an abutment for the end plate at one end of the disc assembly and a nut having threaded engagement with the shaft and arranged to engage the end plate at the opposite end of the disc assembly to apply an axial load thereto by placing the shaft in tension.

6. A rotor construction as claimed in claim 5, wherein the tightening means also includes a second shoulder on the shaft providing a limit abutment for the nut and located at such a position near said opposite end of the disc assembly that the end plate abutting said opposite end of the disc assembly does not overhang the shoulder, and a load-transmitting washer between the nut and the end plate abutting said opposite end of the disc assembly, said washer having an axial thickness which is greater by a preselected amount than the axial distance between the second shoulder and the end plate abutting said opposite end of the disc assembly, whereby, on engaging the nut with the shaft, a predetermined axial load can be applied to the disc assembly.

7. A rotor drum for an axial multi-stage compressor or turbine comprising a central shaft, a plurality of relatively thin cross-section discs, said discs being axially spaced apart at their centres and peripheries, and said discs being supported at their centres in axial alignment on said shaft, co-operating axially-directed spline formations on said shaft and on each of said discs whereby said discs are torsionally engaged with the shaft and each disc at its centre is axially free on the shaft independently of the other discs, a plurality of stages of rotor blading, each stage of rotor blading being carried on the periphery of a disc, a plurality of spacer rings, there being a spacer ring interposed between each pair of adjacent discs to abut against the discs near their peripheries, and tightening means to nip the disc assembly axially in compression through the peripheries of the discs and said spacing rings by applying an axial tension to the shaft.

8. A rotor construction as claimed in claim 7, wherein each stage of rotor blading comprises a plurality of blades, each blade having a root platform, and wherein the spacer rings are of H-section and are located with their central webs substantially radial, with their radially inner flanges in spigoted engagement with the discs adjacent the periphery thereof and with their outer flanges in alignment with the outer surfaces of the root-platforms of the blades carried by the adjacent discs.

9. A rotor construction as claimed in claim 7, wherein said tightening means includes a shoulder on the shaft providing an abutment for one end of the disc assembly, and a nut having threaded engagement with the shaft and arranged to engage the opposite end of the disc assembly to apply an axial load thereto by placing the shaft in tension.

10. A rotor construction as claimed in claim 7, wherein said tightening means also includes a second shoulder on the shaft providing a limit abutment for the nut and located so that the said opposite end of the disc assembly does not overhang the second shoulder, and a washer between the nut and the said opposite end of the disc assembly to transmit axial loads therebetween, said washer having an axial thickness which is greater by a preselected amount than the axial distance between the second shoulder and said opposite end of the disc assembly, whereby, on tightening the nut on the shaft, a predetermined axial load can be applied to the discs assembly.

11. A rotor construction for an axial multi-stage compressor or turbine comprising a central shaft, a plurality of relatively thin cross-section discs, said discs being axially-spaced apart at their centres and peripheries and being supported at their centres in axial alignment on the shaft, for each disc cooperating axially-directed features on the said shaft and the said disc whereby the said discs are torsionally engaged with the shaft and whereby each said disc has at its centre axial freedom on the shaft independently of the other discs, a plurality of stages of rotor blading, each stage of rotor blading being carried on the periphery of a disc, a plurality of spacer rings, there being a spacer ring interposed between each pair of adjacent discs to abut against the discs near their peripheries, and tightening means to nip the disc assembly axially in compression through the peripheries of the discs and said spacing rings by applying an axial tension to the shaft, which tightening means includes a shoulder on the shaft providing an abutment for one end of the disc assembly, a nut having threaded engagement with the shaft and arranged to engage the opposite end of the disc assembly to apply an axial load thereto by placing the shaft in tension, a second shoulder on the shaft providing a limit abutment for the nut and located so that the said opposite end of the disc assembly does not overhang the second shoulder, and a washer between the nut and the said opposite end of the disc assembly to transmit axial loads therebetween, said washer having an axial thickness which is greater by a preselected amount than the axial distance between the second shoulder and said opposite end of the disc assembly, whereby, on tightening the nut on the shaft, a predetermined axial load can be applied to the disc assembly.

ADRIAN ALBERT LOMBARD.
KENNETH IVOR CLIFFORD VINCENT.
FREDERICK WILLIAM WALTON MORLEY.

REFERENCES CITED

The following references are of record in the file of this patent:

UNITED STATES PATENTS

| Number | Name | Date |
|---|---|---|
| 1,440,209 | Church | Dec. 26, 1922 |
| 1,873,956 | Dahlstrand | Aug. 30, 1932 |
| 1,886,414 | Meyer | Nov. 8, 1932 |
| 2,213,940 | Jendrassik | Sept. 3, 1940 |
| 2,356,605 | Meininghaus | Aug. 22, 1944 |
| 2,452,782 | McLeod et al. | Nov. 2, 1948 |
| 2,461,242 | Soderberg | Feb. 8, 1949 |
| 2,497,151 | Clark | Feb. 14, 1950 |
| 2,579,745 | Lombard et al. | Dec. 25, 1951 |

FOREIGN PATENTS

| Number | Country | Date |
|---|---|---|
| 74,422 | Austria | July 10, 1918 |